Patented June 16, 1931

1,809,970

UNITED STATES PATENT OFFICE

IRVING L. HOLLAND AND ROY W. KLAUS, OF CHICAGO, ILLINOIS; SAID HOLLAND ASSIGNOR TO JOHN A. MARZALL

CLEANER

No Drawing. Application filed December 28, 1928. Serial No. 329,071.

This invention relates to liquid cleaners in general, and particularly to cleaners for removing dirt, grease and spots from glass, vitrolite and other surfaces.

The object of the invention is to provide a novel combination of ingredients which will clean and polish glass, vitrolite and other materials.

Another object is to provide a cleaner for glass, and the like, which will quickly dissolve grease, which will retard fogging, and which will produce a lustre.

Another object is to provide a liquid cleaner for glass, and the like, which is effective in use, which can be easily and simply applied, and which can be readily and economically manufactured.

The invention comprises in general a solution for cleaning automobile windshields, and all other kinds of glass, as well as vitrolite, and other similar surfaces. The cleaner consists of the proper proportion of ingredients and includes, alcohol, acetic acid, an essential oil and water.

It has been found that alcohol is the agent which cuts grease and is the chief dirt removing and cleaning ingredient of the cleaner. Good results can be obtained by using a solution of acetic acid and water but it is not satisfactory for general use as it is not efficient enough for ordinary purposes. If acetic acid is added to a solution of alcohol and water a very good cleaning agent is propounded, but glass cleaned with a solution of this kind would not bring out a luster, or high polish, which is highly desirable.

A small quantity of oil of sassafras added to a solution of water, alcohol and acetic acid preserves all the inherent advantages of each of the cleaning agencies and also causes the surface cleaned to become lustrous and polished. Oil of sassafras also counteracts the odor of alcohol and acetic acid and gives the present solution a pleasant and wholesome smell. While other essential oils, such as oil of wintergreen may be used, it has been found in actual practice that oil of sassafras is the most desirable.

In carrying out the invention it has been found that a 12 oz. bottle of the solution, by volume, should include approximately 2 oz. or 60 c. c. (16.67%) of alcohol, ½ oz. or 15 c. c. (4.16%) of 36% glacial acetic acid, 30 drops or 2 c. c. (.55%) of oil of sassafras, and Q. S. or $9\frac{7}{10}$ oz. (78.62%) of water, to obtain the best results.

A solution containing this proportion of ingredients produces a cleaner which thoroughly cleans glass, removes all spots therefrom and produces a high polish.

In practice it has been found that an automobile windshield cleaned with the solution will have all oil and grease spots, specks, and dirt removed therefrom and leave a clean, polished surface. The solution also prevents the windshield from becoming fogged or holding condensation, and rain drops and water on the windshield quickly runs off leaving a clear vision for the driver.

The cleaner is very effective and efficient in use and is economical from the standpoint of both the user and manufacturer, as a small quantity on a cloth is sufficient to clean an ordinary window or windshield. The solution is particularly advantageous for winter use as its freezing temperature is very low.

A few drops, or a small quantity, of coloring matter may be added to the solution to make it attractive to the purchaser, but this is a matter of choice and has nothing to do with the effectiveness of the cleaner.

The alcohol used in the cleaner may be pure grain alcohol but it has been found that denatured alcohol is cheaper in price and it is this latter ingredient which is used in the present invention.

While it has been found that the best results are obtained by making the cleaner in accordance with the percentage of ingredients mentioned, it is to be understood that these percentages may be varied as desired, and that while denatured alcohol and oil of sassafras are used exclusively, grain alcohol and essential oils, such as oil of wintergreen may be used with like or similar success. Also acetic acid of strengths other than that mentioned relative to glacial acetic acid may be used advantageously.

The invention is susceptible to be changed according to the ingredients or percentages thereof within the purview of the appended claims.

The invention is hereby claimed as follows:

1. A liquid cleaner for glass and the like comprising alcohol, acetic acid, an essential oil, and water.

2. A liquid cleaner composed of approximately 16.67% denatured alcohol, 4.16% of 36% glacial acetic acid, .55% oil of sassafras and 78.62% of water, by volume.

3. A liquid cleaner for glass and other similar surfaces and containing water, alcohol, an essential oil and acetic acid, the amount of water being at least twice as great in volume as all the other ingredients combined.

4. A liquid cleaner for glass and other hard surfaces and containing water, alcohol, acetic acid and an essential oil, the amount of water being greater in volume than any other ingredient.

IRVING L. HOLLAND.
ROY W. KLAUS.